US006627071B1

(12) United States Patent
Braden

(10) Patent No.: US 6,627,071 B1
(45) Date of Patent: Sep. 30, 2003

(54) CHLORINATOR FOR WASTEWATER TREATMENT SYSTEMS

(76) Inventor: Michael R. Braden, 38991 Wiggins Rd., Hempstead, TX (US) 77445

( * ) Notice: Subject to any disclaimer, the term of this patent is extended or adjusted under 35 U.S.C. 154(b) by 56 days.

(21) Appl. No.: 10/041,233

(22) Filed: Jan. 7, 2002

(51) Int. Cl.$^7$ .................................................. C02F 1/50
(52) U.S. Cl. ..................... 210/121; 210/136; 210/198.1
(58) Field of Search ............................. 210/198.1, 136, 210/121

(56) References Cited

U.S. PATENT DOCUMENTS

| 3,727,632 A | * | 4/1973 | Pansini ....................... 137/268 |
| 3,996,139 A | | 12/1976 | Prince et al. |
| 4,019,983 A | | 4/1977 | Mandt |
| 4,100,073 A | | 7/1978 | Hopcroft |
| 4,333,833 A | | 6/1982 | Longley et al. |
| 5,350,512 A | | 9/1994 | Tang |
| 5,405,540 A | | 4/1995 | Tang |
| 6,182,681 B1 | * | 2/2001 | Robertson et al. .......... 137/268 |
| 6,183,630 B1 | | 2/2001 | Reeves |

* cited by examiner

Primary Examiner—Chester T. Barry
Assistant Examiner—Douglas J. Theisen
(74) Attorney, Agent, or Firm—Kenneth A. Keeling; James E Hudson, III

(57) ABSTRACT

A chlorinator for wastewater treatment systems having a circulation pump and return flow line, which includes a tank having an internal space, a buoyant container within the internal space which intakes a determined quantity of disinfectant fluid through a check valve from a quantity of such fluid disposed in said tank. The check valve limits flow during operation of the circulation pump. Operation of the circulation pump causes flow through the return line, inducing distribution of the quantity of disinfectant fluid into the circulation tank. After cessation of the circulation pump, the check valve opens to reestablish the quantity of disinfectant fluid. Regardless of the duration of pumping, only the uniform volume of disinfectant fluid is supplied.

20 Claims, 5 Drawing Sheets

CHLORINATOR FOR WASTEWATER TREATMENT SYSTEMS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

This invention related generally to chlorinators for wastewater treatment systems. More specifically, this invention is a chlorinator for wastewater treatment systems, which have a disinfectant chamber that permits a uniform volume of disinfectant to be used each cycle.

2. Related Art

Chlorinators, which use either solid or liquid disinfectants, are known to the prior art. Illustrative of chlorinators using solid disinfectants are U.S. Pat. No. 6,183,630 issued to Reeves on Feb. 6, 2001; U.S. Pat. No. 4,100,073 issued to Hopcroft on Jul. 11, 1978; U.S. Pat. No. 5,350,512 issued to Tang on Sep. 27, 1994; and U.S. Pat. No. 5,405,540 issued to Tang on Apr. 11, 1995. Illustrative of chlorinators using liquid disinfectants are U.S. Pat. No. 4,333,833 issued to Longley et. al. on Jun. 8, 1982; U.S. Pat. No. 4,019,983 issued to Mandt on Apr. 26, 1977 and U.S. Pat. No. 3,996,139 issued to Prince et al. on Dec. 7, 1976.

Chlorination is widely used as part of wastewater treatment systems. In practice, a disinfectant such as chlorine is introduced at a point in the wastewater treatment system after which sufficient time, either by flow into a storage tank or through a region of flow, occurs to permit the chlorine to effectively disinfect the contaminant-bearing wastewater. The amount of disinfectant added to the wastewater is referred to as the "dosage," and is usually expressed as milligrams per liter (mg/l) or parts per million (ppm). The amount of disinfectant necessary to disinfect a particular volume of wastewater is referred to as the "demand."

The reaction between the disinfectant and the contaminants is typically not instantaneous but is instead time dependent. In order to obtain adequate disinfection, the mixing of wastewater and disinfectant should be completed in the shortest time possible, ideally a fraction of a second. The amount of disinfectant remaining in the wastewater at the time of measurement is referred to as the "residual." The residual is therefore determined by the demand subtracted from the dosage.

Prior art chlorinators, whether using a liquid or solid disinfectant, typically mix the disinfectant with the wastewater during the flow of wastewater through the wastewater treatment system. In the case of chlorinators using a solid disinfectant, such as those disclosed in U.S. Pat. No. 6,183,630 issued to Reeves on Feb. 6, 2001; U.S. Pat. No. 4,100,073 issued to Hopcroft on Jul. 11, 1978; U.S. Pat. No. 5,350,512 issued to Tang on Sep. 27, 1994; and U.S. Pat. No. 5,405,540 issued to Tang on Apr. 11, 1995, mixing occurs by wastewater flow about a plurality of disinfectant tablets. In such systems the disinfectant is mixed at a rate dependant on the surface area of the table in contact with the wastewater, the density of the wastewater and the flow rate of the wastewater, among other variables. In the case of chlorinators using a liquid disinfectant, such as U.S. Pat. No. 4,333,833 issued to Longley et. al. on Jun. 8, 1982 mixing occurs at a contactor in the flowline wherein disinfectant fluid is drawn from a reservoir by pressure differential. In such systems the amount of chlorine combined with the wastewater varies with the flow rate of the wastewater and; wastewater density. Thus it would be beneficial to the prior art to provide a chlorinator that dispenses a uniform volume of chlorine.

Typical water treatment systems contain sequential chambers for elimination of solid waste, which would not be consumed by aerobic action, for aerobic treatment of the wastewater, for clarification of the wastewater and for storage of treated wastewater prior to disbursal to the environment by a sprinkler system. Disinfectant is mixed with the treated wastewater between clarification and disbursal. Disbursal of treated wastewater by a sprinkler system is accomplished by mechanical pumping action. Such systems utilize a pump, which generates pressure in excess of that necessary for operation of the attached sprinkler system. As a result a pressure relief valve set to the necessary sprinkler pressure is located in the pump line prior to exit from the pump tank. This valve permits return of a necessary amount of treated wastewater into the pump tank so as not to exceed the necessary sprinkler pressure. Return of treated wastewater into the pump tank creates a turbulent area within the treated wastewater in the pump tank. It would be beneficial to the prior art to provide a chlorinator that dispenses a uniform volume of chlorine into this turbulent area without an external power supply.

BRIEF SUMMARY OF THE INVENTION

Accordingly, the objects of my invention is to provide, inter alia, a chlorinator for aerobic waste treatment systems that:

dispenses a uniform volume of liquid disinfectant;

rapidly mixes the disinfectant fluid with the wastewater; and functions without the need for a power source beyond that in an existing wastewater treatment system.

Other objects of my invention will become evident throughout the reading of this application.

My invention is a chlorinator for waste treatment systems that is in functional attachment to a pump line in a pump tank, which dispenses a uniform volume of disinfectant fluid during each pump cycle, regardless of the duration of the cycle.

DESCRIPTION OF THE INVENTION

Figure 1:
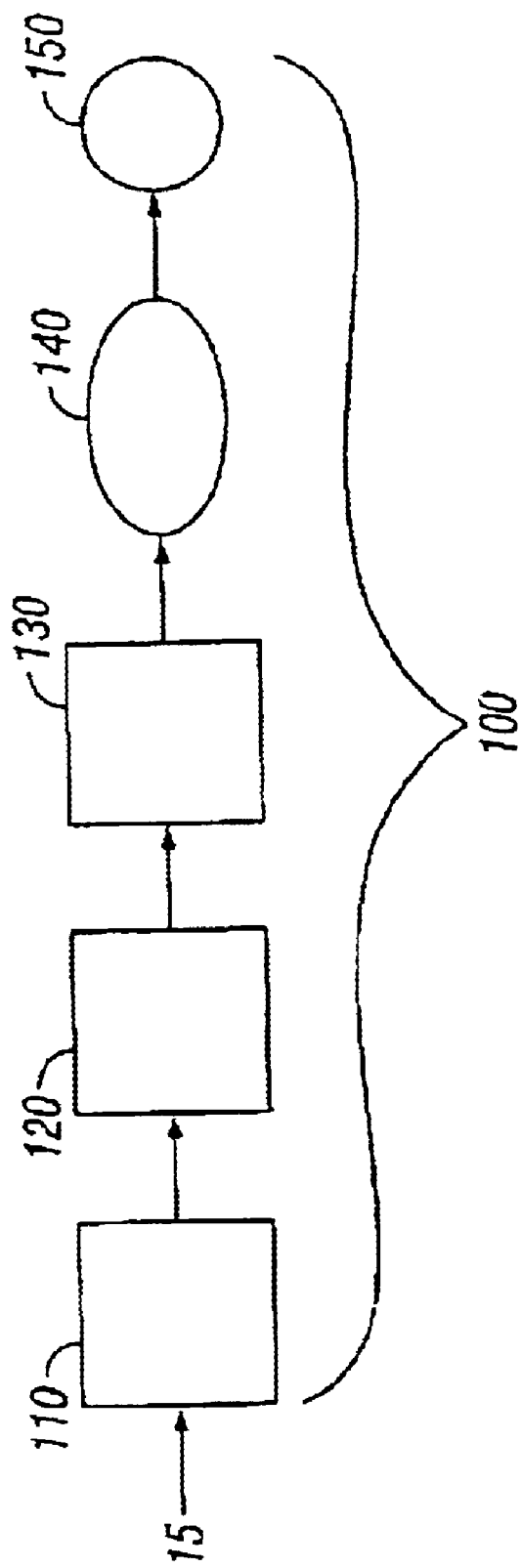
FIG. 1 is a schematic diagram of a typical septic system.

As shown in FIG. 1, a typical water treatment system 100 contains a series of steps that prepare wastewater 15 for release into the environment. The exemplary water treatment system 100 has a solid waste elimination chamber 110, an aerobic treatment chamber 120, a clarification chamber 130, a chlorine addition step 140 and a disbursal step 150. This invention addresses the chlorine addition step 140.

Figure 2:
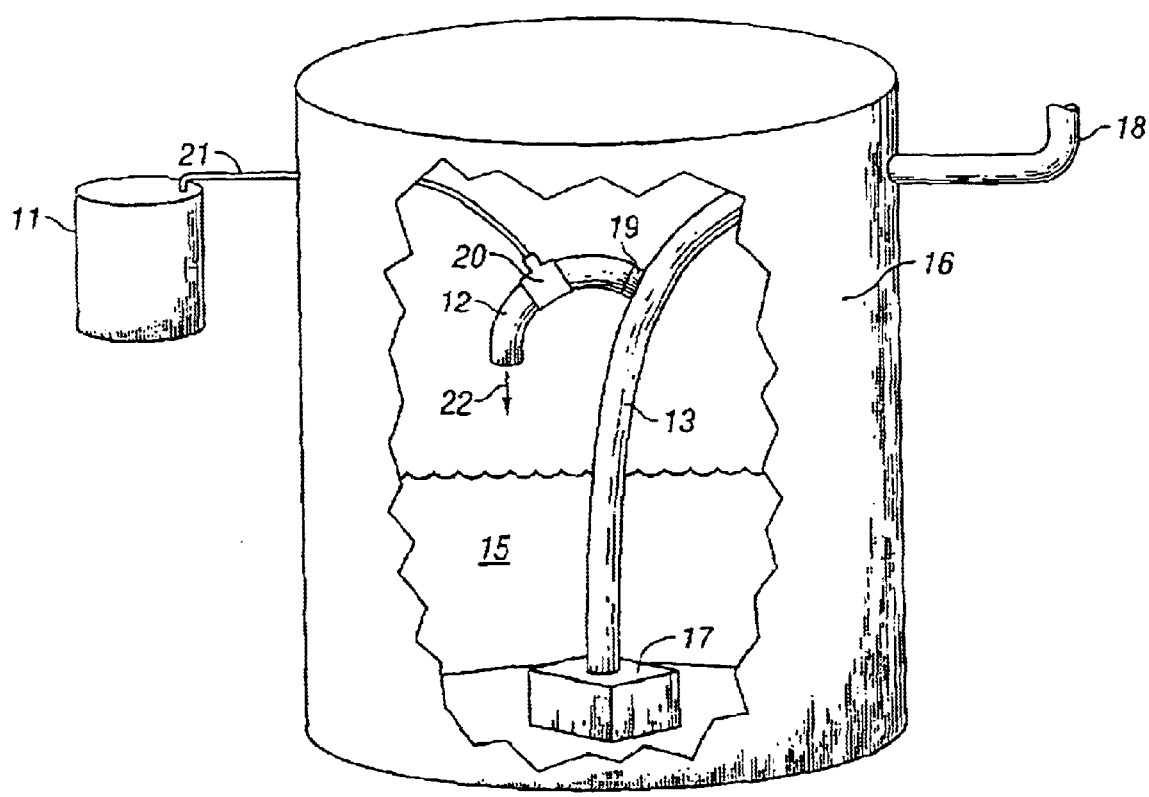
FIG. 2 is a partial cut-away side view of the wastewater treatment system pump tank of the present invention.

As shown in FIG. 2, the chlorinator 11 is in functional attachment to flow return line 12 of pump line 13 and, while in use, disburses a uniform volume of disinfectant fluid 14 through disinfectant fluid line 21, into flow return line 12 to be mixed with return wastewater 22 and ultimately with wastewater 15 in the pump tank 16. Pump tank 16 provides storage for wastewater 15 prior to being pumped by pump 17 to the sprinkler system 18. Pump 17 transmits wastewater 15 at a pressure significantly higher than necessary for sprinkler system 18. A pressure relief valve 19 in pump line 13 releases a sufficient volume of wastewater 15 into flow return line 12 to prevent damage to sprinkler system 18 due to excessive pressure. Pump 17 operates on an intermittent basis. Pump 17 is activated either by timer or by the level of wastewater 15 and operates until the termination of the time cycle or until wastewater falls below a specific level in pump tank 16. At all times during operation of pump 17 some portion of wastewater 15 is diverted by pressure relief value 19 to flow return line 12 as return wastewater 22. When return wastewater 22 flows through flow return line 12 disinfectant fluid 14 comes from chlorinator 11 through disinfectant fluid line 21 at disinfectant connection 20. Disinfectant fluid 14 enters the return wastewater 22, which returns to pump tank 16, and mixes back into the balance of wastewater 15. Disinfectant fluid 14 is thereby mixed with wastewater 15 in pump tank 16 during the operation of pump 17. In a typical system, the pump 17 produces substantially more pressure than the maximum pressure of the sprinkler system 18, so the return wastewater 22 pressure is also substantial, creating turbulence in the pump tank 16 upon its return to the wastewater 15.

Figure 5:
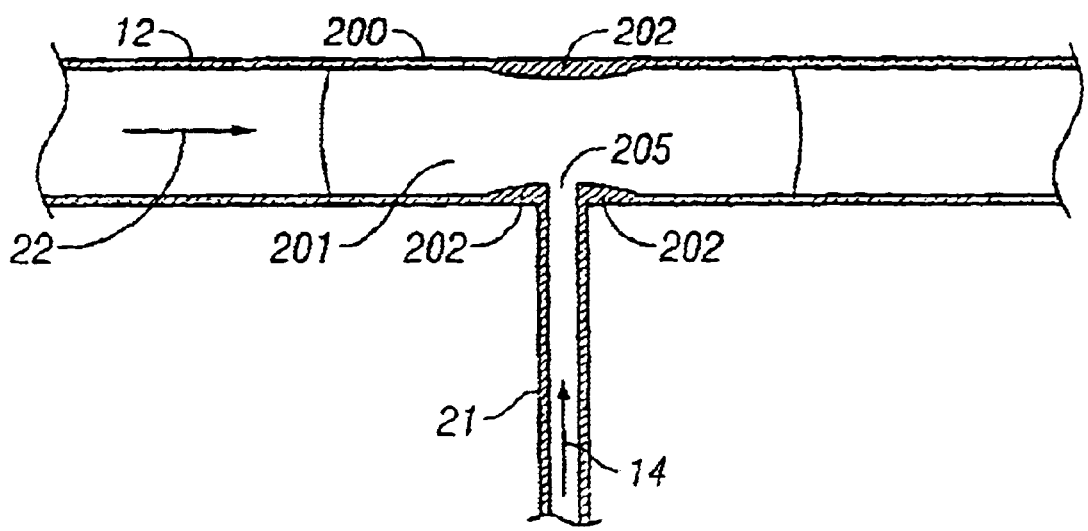
FIG. 5 is a cross-sectional side view of a typical flow powered venturi vacuum pump.

Referring to FIG. 2 and FIG. 5, in the exemplary embodiment the disinfectant connection 20 is a flow-powered venturi vacuum pump 200 located in flow return line 12. As understood in the art and illustrated in FIG. 5, a flow-powered venturi vacuum pump 200 is a device which generates an area of reduced pressure in chamber 201 by passing a liquid, in this case return wastewater 22, in flow return line 12, through the chamber 201, defined by a narrowed wall segment 202. The reduced pressure in chamber 201 draws disinfectant fluid 14 through disinfectant fluid line 21, out pump opening 205 and into flow return line 12.

Figure 3A:
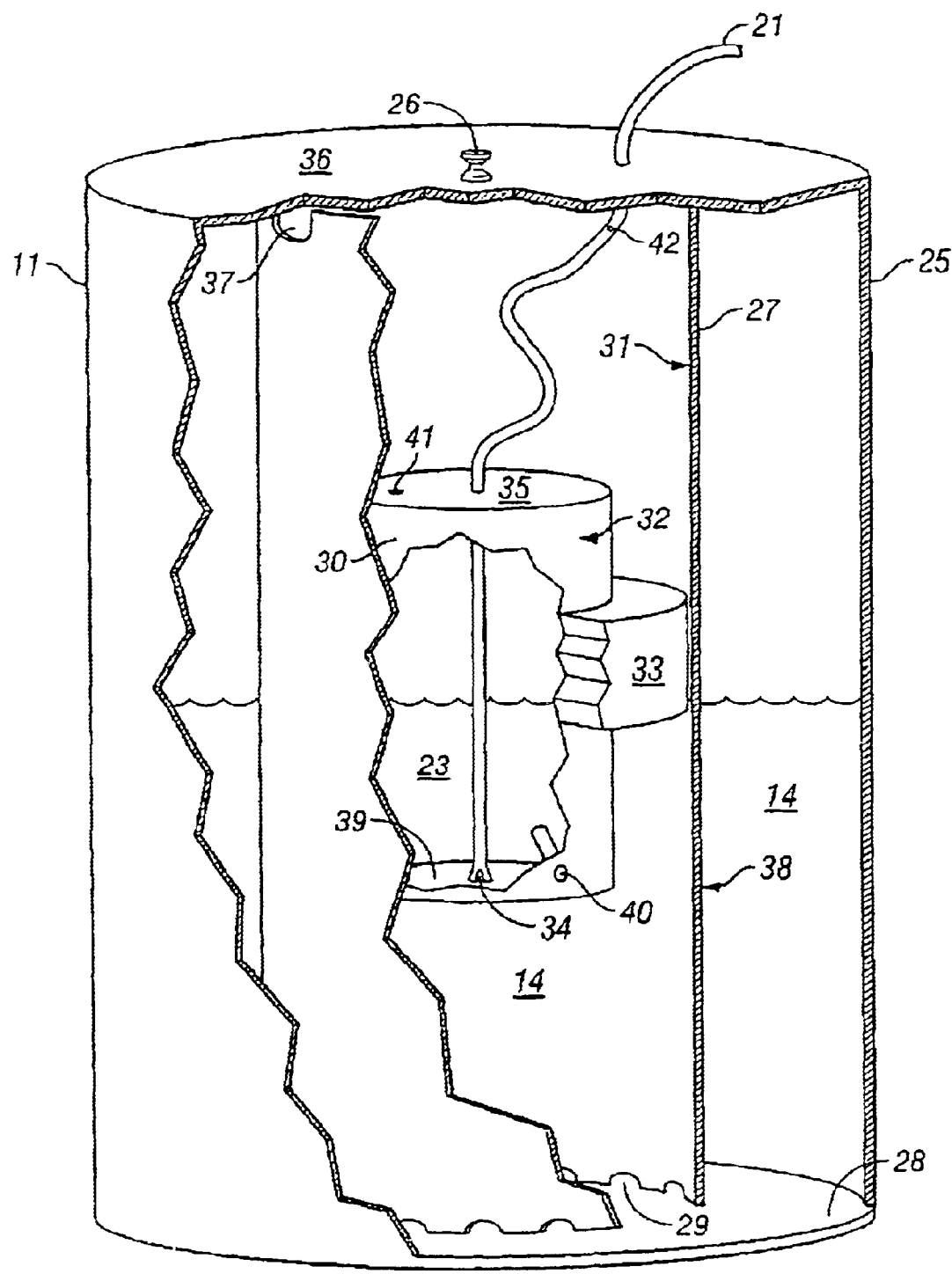
FIG. 3a is a partial cut-away side view of the exemplary chlorinator functionally attached to the flow return line of the pump line.
Figure 3B:
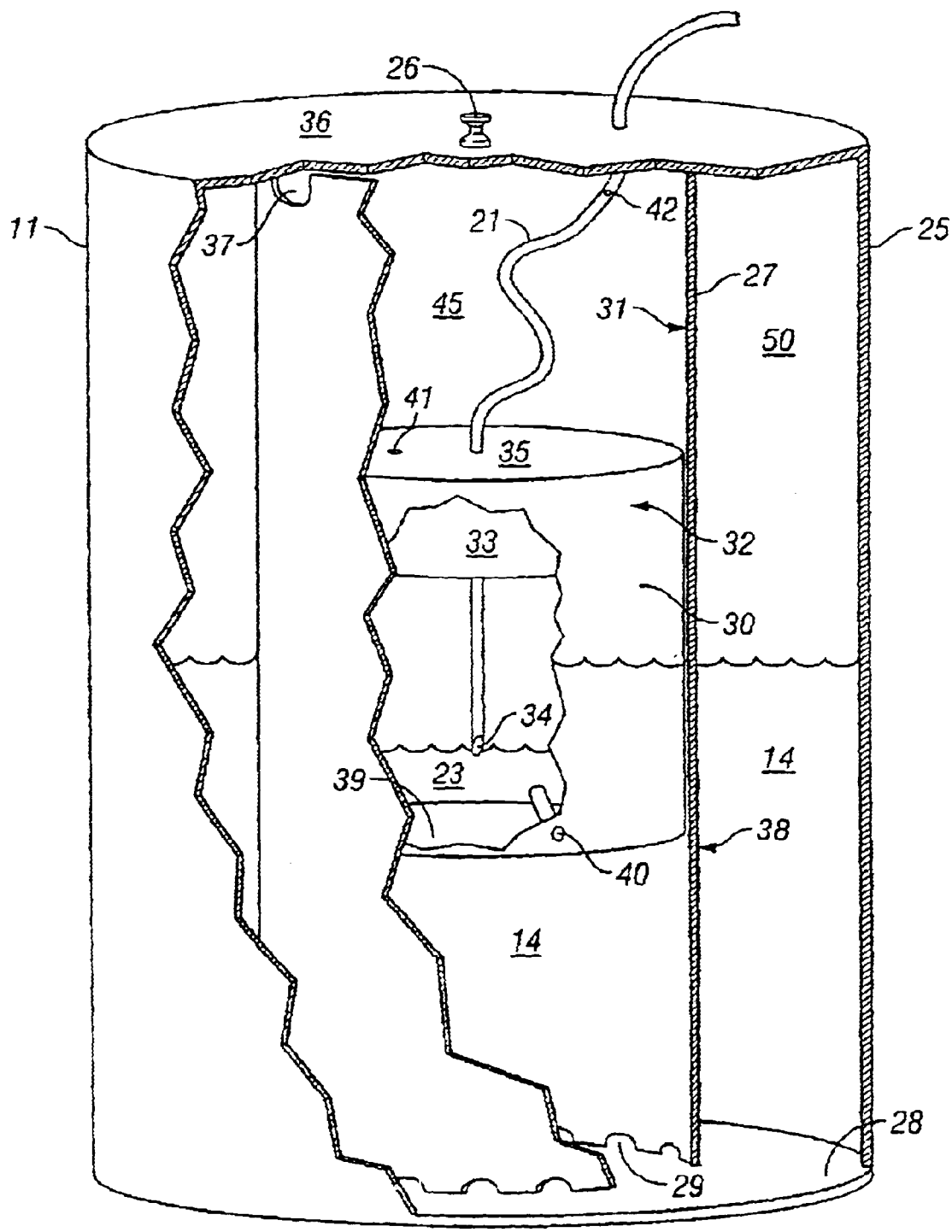
FIG. 3b is a partial cut-away side view of an alternative exemplary chlorinator functionally attached to the flow return line of the pump line.

Referring to FIGS. 3a and 3b, when the operation of pump 17 begins disinfectant fluid 14 is withdrawn from chlorinator 11. In the exemplary embodiment the flow-powered venturi vacuum pump 200 draws the entire volume 23 of disinfectant fluid 14 into the wastewater 15 in under a minute. Once volume 23 is disbursed, chlorinator 11 ceases to supply additional disinfectant fluid 14 and instead supplies air, which is drawn from container 30. Volume 23 is replenished after operation of pump 17 ceases and check valve 40 opens.

Chlorinator 11, in FIGS. 3a and 3b, includes an external tank 25 within which has been securely mounted an internal tank 27. The interior of internal tank 27 defines a core space 45. The space surrounding internal tank 27, inside external tank 25 is an annular space 50. Both core space 45 and annular space 50 are constructed to house a supply of disinfectant fluid.

External tank 25 and internal tank 27 are vented to the external atmosphere by vent 26 in a common top 36. In an alternate exemplary embodiment, the common top 36 is threaded and not sealed so as to allow sufficient ventilation through the threads (not shown). External tank 25 and internal tank 27 share a common base 28. Lower openings 29 have been created immediately above common base 28 through the wall 38 of internal tank 27. External tank 25 and internal tank 27 share the common top 36, below which upper openings 37 have been created through the wall 38 of internal tank 27. External tank 25 and internal tank 27 communicate disinfectant fluid 14 and internal atmosphere through lower openings 29 and upper openings 37, which serve to allow equal pressure between external tank 25 and internal tank 27.

Chlorinator 11 in FIGS. 3a and 3b also includes container 30 fitted within internal tank 27 so as to restrict the motion of container 30 to vertical movement. Referring to FIG. 3a, in the exemplary embodiment float 33 laterally surrounds the container wall 32. Float 33 is sized so as to freely move along the internal sides 31 of internal tank 27. Internal tank 27 thereby acts as a guide to restrict the lateral motion of container 30 and float 33. Float 33 is composed of a buoyant material, which prevents container 30 from settling too far into the disinfectant fluid 14 supply contained in internal tank 27. Volume 23 of disinfectant fluid 14 is the maximum volume of disinfectant fluid 14, which can be communicated to container 30 based on the buoyancy of float 33 and container 30 when check valve 40 is open.

Referring to FIG. 3b, an alternative exemplary embodiment has float 33 situated inside container 30, proximate to container top 35. In this embodiment disinfectant fluid line 21 extends through container top 35 and float 33 to immerse into volume 23. Container 30 is sized so container wall 32 is proximate to the internal sides 31 of internal tank 27. In this manner the internal tank 27 still acts as a guide to restrict the lateral motion of container 30.

Disinfectant fluid line 21 penetrates external tank 25 and internal tank 27. In the exemplary embodiment this is done through common top 36 within internal sides 31 of internal tank 27. Disinfectant fluid line 21 is flexible and has sufficient length inside internal tank 27 to not interfere with the free movement of container 30. Alternatively, disinfectant fluid line 21 may penetrate external tank 25 and internal tank 27 in other locations, so long as disinfectant fluid line 21 does not interfere with the vertical movement of container 30 within internal tank 27.

Disinfectant fluid line 21 penetrates container top 35 and extends a fixed distance into container 30. In FIG. 3a, the exemplary embodiment disinfectant fluid line 21 is mounted to the internal bottom 39 of container 30. At least one disinfectant fluid line opening 34 is provided in disinfectant fluid line 21 near internal bottom 39 of container 30 to allow volume 23 of disinfectant fluid 14 to be drawn from container 30.

In FIG. 3b, an alternative exemplary embodiment disinfectant fluid line 21 extends into container 30, but does not extend all the way to the internal bottom 39. Disinfectant fluid line opening 34 is thereby positioned a set distance from the internal bottom 39. The level to which disinfectant fluid line opening 34 extends and the upper level to which disinfectant 14 in container 30 attains when check valve 40 is open defines volume 23 in this embodiment.

Referring to FIGS. 3a and 3b, check valve 40 is also mounted near the internal bottom 39 of container 30 in wall 32 and, when open, permits communication of disinfectant fluid 14 from internal tank 27 to container 30. A siphon relief opening 41 is located in the container top 35 of container 30, and allows air displaced by the influx of disinfectant fluid 14 to escape. In an alternate exemplary embodiment siphon relief opening 41 is located in the container wall 32, positioned above the upper level of volume 23. When container 30 reaches volume 23 communication of disinfectant fluid 14 and air displacement ceases.

Referring to FIGS. 2, 3a and 3b, when pump 17 is operating, disinfectant fluid 14 is drawn from chlorinator 11 through disinfectant fluid line 21 to flow return line 12, and check valve 40 prevents additional disinfectant fluid from entering container 30. Siphon relief opening 41 allows for a sufficient decrease in the pressure within container 30 to close check valve 40, while not creating a vacuum sufficient to cause return wastewater 22 to be drawn into disinfectant line 21. When pump 17 ceases operation, the pressure within container 30 balances with the internal atmosphere 24 through siphon relief opening 41, allowing check valve 40 to open and permit disinfectant fluid 14 from internal tank 27 to flow into container 30. Volume 23 is then replenished as disinfectant fluid 14 flows into container 30.

Figure 4:
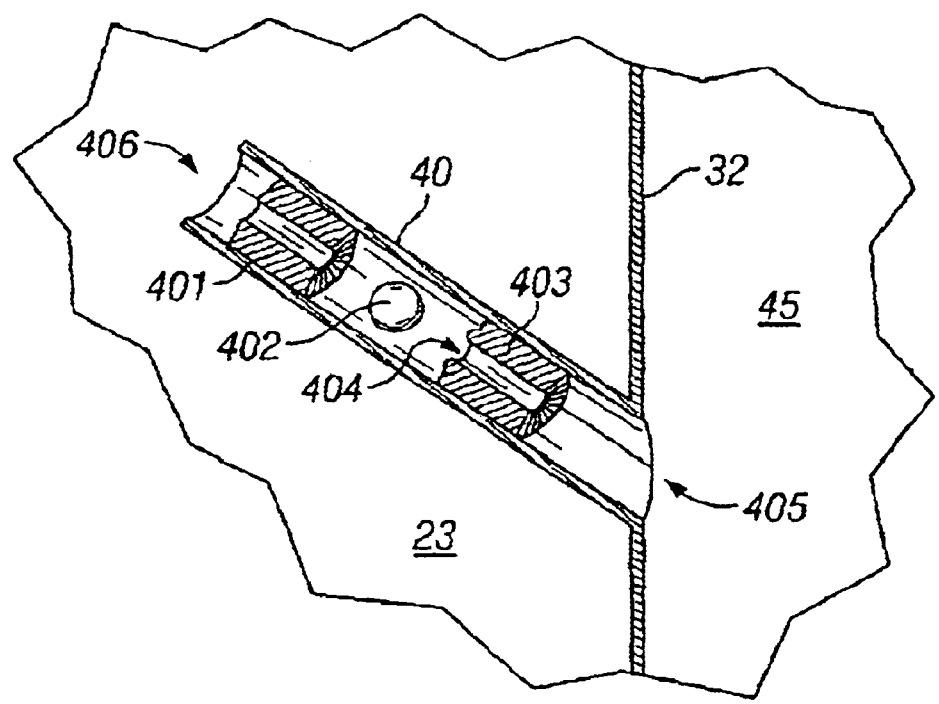
FIG. 4 is a cross-sectional side view of a ball cock valve for use in the chlorinator.

As shown in FIG. 4, check valve 40 may be comprised of an upper sheet washer 401, a valve ball 402, and a lower sheet washer 403 having a notched exposed surface 404. The valve ball 402 must be sufficiently dense as to not float in the disinfectant fluid 14, yet buoyant enough to be moved by the disinfectant fluid 14 flowing through the check valve 40. The term neutral buoyancy is used to describe the condition when an item neither sinks nor rises in a particular fluid. In the exemplary embodiment, valve ball 402 is of lesser buoyancy than neutral buoyancy in the disinfectant fluid, so valve ball 402 can unseat from upper sheet washer 401. In the exemplary embodiment the valve ball 402 is a dense ceramic material. When pump 17 operates, disinfectant fluid 14 flows from container 30 through disinfectant fluid line 21. The flow of internal atmosphere is moderated by the siphon relief opening 41, and air pressure is reduced within container 30. The reduced pressure increases the force with which the disinfectant fluid 14 attempts to enter container 30 through check valve 40, passing through inlet opening 405. The reduced pressure within container 30, together with the buoyancy effect of liquid disinfectant, causes the valve ball 402 to seat against upper sheet washer 401, preventing further communication of disinfectant fluid 14 from internal tank 27 to container 30, through outlet opening 406.

When pump 17 ceases, the air pressure within container 30 increases as atmosphere from within internal tank 27 enters through siphon relief opening 41. The increased pressure within container 30 decreases the air pressure exerted on the valve ball 402 of the check valve 40. With increased relative air pressure in container 30, the pressure of the disinfectant fluid 14 against the valve ball 402 is not sufficient to maintain a seal between the valve ball 402 and upper sheet washer 401. Valve ball 402 may completely unseat from upper sheet washer 401 and settle on lower sheet washer 403. The notched exposed surface 404 of lower sheet washer 403 prevent the ball cock from securely seating on lower sheet washer 403. This ensures that the disinfectant fluid 14 may freely intermingle, both inside and outside of container 30 through check valve 40 while pump 17 is not operating.

In an alternate embodiment check valve 40 may be oriented generally horizontally. The force with which the disinfectant fluid 14 attempts to enter container 30 through check valve 40 during the operation of pump 17 lifts valve ball 402 into a position to occlude the hole in upper sheet washer 401. When pump 17 ceases, the air pressure within container 30 increases as atmosphere from within internal tank 27 enters through siphon relief opening 41. The increased pressure within container 30 decreases the air pressure exerted on the valve ball 402 of the check valve 40. With increased relative air pressure in container 30, the pressure of the disinfectant fluid 14 against the valve ball 402 is not sufficient to maintain a seal between valve ball 402 and upper sheet washer 401. Valve ball 402 falls away from the hole in upper sheet washer 401 permitting disinfectant fluid to flow into container 30.

Referring to FIGS. 3a and 3b, an anti-siphon aperture 42 penetrates disinfectant fluid line 21 within internal tank 27. The anti-siphon aperture 42 is so sized as to allow very little airflow in relationship to the disinfectant fluid 14 flow in disinfectant fluid line 21 when the pump 17 is operating. The anti-siphon aperture 42 allows for a periodic bubble (not shown) of internal atmosphere to be drawn into the disinfectant fluid 14 being drawn through disinfectant fluid line 21. When pump 17 is not operating, airflow through the anti-siphon aperture 42 prevents a siphon effect from continuing to draw disinfectant fluid 14 from the chlorinator 11. Disinfectant fluid 14 on the chlorinator 11 side of the bubble (not shown) will return to container 30, while the remaining disinfectant 14 in disinfectant fluid line 21 will flow on to pump tank 16.

In the exemplary embodiment, anti-siphon aperture 42 draws air from within chlorinator 11, which is relatively saturated with disinfectant gas, thereby possessing less capacity to degrade the disinfectant fluid with which it comes in contact.

The foregoing disclosure and description of the invention is illustrative and 11 explanatory thereof. Various changes in the details of the illustrated construction may be made within the scope of the appended claims without departing from the spirit of the invention. The present invention should only be limited by the following claims and their legal equivalents.

I claim:

1. A chlorinator for a wastewater treatment system having a tank pump and a pressure relief valve, said pressure relief valve communicating with a return line, comprising:

a disinfectant tank having a tank interior;

a core wall defining core space and an annular space in said tank interior;

said core space in fluid communication with said annular space;

a container located in said core space;

a flow line in fluid communication with said return line and said container;

said flow line having a container end opening and a pump opening;

said container end opening disposed in a container interior;

a flow pump operably connected to said return line;

said pump opening operably connected to said flow pump;

a check valve provided in said container; and said check valve providing limited fluid communication from said tank interior to said container interior.

2. The chlorinator in claim 1, wherein:

said tank interior operable to retain a quantity of disinfectant fluid;

said flow pump operable when fluid flow is induced in said return line;

said flow pump intermittently operable to induce flow of a quantity of said disinfectant fluid from an interior of said container;

said check valve allowing flow of said disinfectant fluid into said container when said flow pump is not in operation; and said check valve restricting flow of said disinfectant fluid into said container when said flow pump is in operation.

3. The chlorinator in claim 1, wherein:

said core wall having a generally vertical orientation; and said container buoyed by said disinfectant fluid.

4. The chlorinator in claim 3, wherein:

said container moveable between an upper position and a lower position;

said container moving from said lower position to said upper position as said disinfectant fluid is withdrawn from said container; and said container moving from said upper position to said lower position as said disinfectant fluid enters said container.

5. The chlorinator in claim 1, further comprising:

an anti-siphon aperture provided in said flow line.

6. The chlorinator in claim 1, wherein:

said flow pump comprises a constricted area in said return line.

7. The chlorinator in claim 1, wherein:

said check valve comprises a valve wall defining a valve interior;

a valve ball in said valve interior;

said valve wall having a valve inlet opening and a valve outlet opening;

said valve inlet opening in fluid communication with said core space;

said valve outlet opening in fluid communication with said container interior; and said valve ball seatable at said valve outlet opening.

8. The chlorinator in claim 7, wherein:

said flow pump inducing a reduced pressure in said container interior during operation of said flow pump;

said valve ball having less than neutral buoyancy in said disinfectant fluid;

said valve ball seating against said outlet valve opening when during operation of said flow pump; and said valve ball removed from said outlet valve opening upon cessation of operation of said flow pump.

9. The chlorinator in claim 7, wherein:

said valve ball partially buoyant in said disinfectant fluid.

10. The chlorinator in claim 3, further comprising:

a float attached to exterior of said container.

11. The chlorinator in claim 3, further comprising:

a float disposed inside said container.

12. A chlorinator for a wastewater treatment system having a tank pump and a pressure relief valve, said pressure relief valve communicating with a return line, comprising:

a disinfectant tank having a tank interior;

a core wall defining core space and an annular space in said tank interior;

said core space in fluid communication with said annular space;

a container located in said core space;

a flow line in fluid communication with said return line and said container;

said flow line having a container end opening and a pump opening;

said container end opening disposed in a container interior;

a flow pump operably connected to said return line;

said pump opening operably connected to said flow pump;

a check valve provided in said container;

said check valve providing limited fluid communication from said tank interior to said container interior;

said tank interior operable to retain a quantity of disinfectant fluid;

said flow pump intermittently operable when fluid flow is induced in said return line;

said flow pump operable to induce flow of a quantity of said disinfectant fluid from an interior of said container;

said check valve allowing flow of said disinfectant fluid into said container when said flow pump is not in operation; and said check valve restricting flow of said disinfectant fluid into said container when said flow pump is in operation.

13. The chlorinator in claim 12, wherein:

said core wall having a generally vertical orientation;

said container buoyed by said disinfectant fluid;

said container moveable between an upper position and a lower position;

said container moving from said lower position to said upper position as said disinfectant fluid is withdrawn from said container; and said container moving from said upper position to said lower position as said disinfectant fluid enters said container.

14. The chlorinator in claim 13, further comprising:

an anti-siphon aperture in said flow line.

15. The chlorinator in claim 13, wherein:

said flow pump comprises a constricted area in said return line.

16. The chlorinator in claim 15, wherein:

said check valve comprises a valve wall defining a valve interior;

a valve ball in said valve interior;

said valve wall having a valve inlet opening and a valve outlet opening;

said valve inlet opening in fluid communication with said core space;

said valve outlet opening in fluid communication with said container interior; and said valve ball seatable at said valve outlet opening.

17. The chlorinator in claim 16, wherein:

said flow pump inducing a reduced pressure in said container interior during operation of said flow pump;

said valve ball having less than neutral buoyancy in said disinfectant fluid;

said valve ball seating against said outlet valve opening when during operation of said flow pump; and said valve ball removed from said outlet valve opening upon cessation of operation of said flow pump.

18. The chlorinator in claim 16, wherein:

said valve ball partially buoyant in said disinfectant fluid.

19. The chlorinator in claim 13, further comprising:

a float attached to exterior of said container.

20. The chlorinator in claim 13, further comprising:

a float disposed inside said container.

* * * * *